(12) United States Patent
Shen et al.

(10) Patent No.: US 11,210,570 B2
(45) Date of Patent: Dec. 28, 2021

(54) METHODS, SYSTEMS AND MEDIA FOR JOINT MANIFOLD LEARNING BASED HETEROGENOUS SENSOR DATA FUSION

(71) Applicant: Intelligent Fusion Technology, Inc, Germantown, MD (US)

(72) Inventors: Dan Shen, Germantown, MD (US); Peter Zulch, Rome, NY (US); Marcello Disasio, Rome, NY (US); Erik Blasch, Arlington, VA (US); Genshe Chen, Germantown, MD (US); Zhonghai Wang, Germantown, MD (US); Jingyang Lu, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 1012 days.

(21) Appl. No.: 15/878,188

(22) Filed: Jan. 23, 2018

(65) Prior Publication Data
US 2019/0228272 A1  Jul. 25, 2019

(51) Int. Cl.
*G06K 9/62* (2006.01)
*G06N 7/08* (2006.01)
(Continued)

(52) U.S. Cl.
CPC ............ *G06K 9/6288* (2013.01); *G01S 13/58* (2013.01); *G06K 9/0063* (2013.01);
(Continued)

(58) Field of Classification Search
CPC ... G06K 9/6248; G06K 9/6252; G06K 9/6214
See application file for complete search history.

(56) References Cited

U.S. PATENT DOCUMENTS

| | | | |
|---|---|---|---|
| 2010/0098306 A1* | 4/2010 | Madabhushi | G06T 7/0012 382/128 |
| 2013/0110323 A1* | 5/2013 | Knight | G05D 1/0083 701/3 |

OTHER PUBLICATIONS

Davenport MA, Hegde C, Duarte MF, Baraniuk RG. Joint manifolds for data fusion. IEEE Transactions on Image Processing. Jun. 14, 2010;19(10):2580-94. (Year: 2010).*

(Continued)

*Primary Examiner* — Clifford Hilaire
(74) *Attorney, Agent, or Firm* — Anova Law Group, PLLC

(57) ABSTRACT

The present disclosure provides a method for joint manifold learning based heterogenous sensor data fusion, comprising: obtaining learning heterogeneous sensor data from a plurality sensors to form a joint manifold, wherein the plurality sensors include different types of sensors that detect different characteristics of targeting objects; performing, using a hardware processor, a plurality of manifold learning algorithms to process the joint manifold to obtain raw manifold learning results, wherein a dimension of the manifold learning results is less than a dimension of the joint manifold; processing the raw manifold learning results to obtain intrinsic parameters of the targeting objects; evaluating the multiple manifold learning algorithms based on the raw manifold learning results and the intrinsic parameters to determine one or more optimum manifold learning algorithms; and applying the one or more optimum manifold learning algorithms to fuse heterogeneous sensor data generated by the plurality sensors.

17 Claims, 11 Drawing Sheets

(51) Int. Cl.
  *G06K 9/68* (2006.01)
  *G06T 7/80* (2017.01)
  *H04N 5/33* (2006.01)
  *G01S 13/58* (2006.01)
  *G06K 9/00* (2006.01)

(52) U.S. Cl.
  CPC ........... *G06K 9/6248* (2013.01); *G06K 9/685* (2013.01); *G06N 7/08* (2013.01); *G06T 7/80* (2017.01); *H04N 5/33* (2013.01); *G06K 2009/6871* (2013.01); *G06T 2207/10048* (2013.01); *G06T 2207/20081* (2013.01); *G06T 2207/30252* (2013.01)

(56) References Cited

OTHER PUBLICATIONS

Wang, C. and Mahadevan, S., Jul. 2011. Heterogeneous domain adaptation using manifold alignment. In IJCAI proceedings—international joint conference on artificial intelligence (vol. 22, No. 1, p. 1541). (Year: 2011).*

Escher, Christine M., and Pongdate Montagantirud. "Classifying seven dimensional manifolds of fixed cohomology type." Differential Geometry and its Applications 49 (2016): 312-325. (Year: 2016).*

* cited by examiner

200

(A)          (B)

METHODS, SYSTEMS AND MEDIA FOR JOINT MANIFOLD LEARNING BASED HETEROGENOUS SENSOR DATA FUSION

GOVERNMENT RIGHTS

This invention was made with Government support under Contract No. FA8750-16-C-0243, awarded by the United States Air Force Research Laboratory. The U.S. Government has certain rights in the present disclosure.

TECHNICAL FIELD

The present disclosure generally relates to the field of information processing technology, and more particularly, relates to methods, systems and media for joint manifold learning based heterogenous sensor data fusion.

BACKGROUND

In many site-monitoring scenarios using multi-sensor modalities, the data streams not only have a high dimensionality, but also belong to different phenomenon. For example, a moving vehicle may have an emitter that transmits radio-frequency (RF) signals, its exhaust system sends acoustic signals, and its perspective observed which may be collected by passive RF receivers, acoustic sensors, and video cameras; respectively. These cases demonstrate that a targeting object is observed by three different modalities (data streams collected by acoustic sensors, passive RF receivers, and cameras) could benefit from sensor fusion to increase the tracking accuracy.

Sensor fusion includes low-level information fusion (LLIF) in which raw data is processed upstream near the sensors for object and situation assessments such as extraction of color features from pixel imagery. High-Level Information Fusion (HLIF) includes the downstream methods in which context is used for sensor, user, and mission refinement. Machine analytics exploitation of sensor data and game theoretic approaches can support operotating relevant scenarios in which users don't have the time to examine all the data feeds and perform real-time sensor management and decision analysis.

Sensor fusion is typically performed by combining the outputs (decisions) of several signature modalities through decision-level fusion. While this data fusion approach improves the performance by incorporating decisions from different modalities, it requires the consideration of the correlation/dependence between data of different modalities. All the data in the measurement domain factually reflects the same objects of interest, which indicates that the measurements of different modalities have strong mutual information between them. The transformation from sensor data to a decision introduces information loss, while feature information such as track pose retains salient information.

Accordingly, it is desirable to provide methods, systems and media for joint manifold learning based heterogenous feature-level sensor data fusion to efficiently fuse all the data of different modalities in the measurement domain with a tolerable cost.

BRIEF SUMMARY

An aspect of the present disclosure provides a method for joint manifold learning based heterogenous sensor data fusion, the method comprising: obtaining learning heterogeneous sensor data from a plurality sensors to form a joint manifold, wherein the plurality sensors include different types of sensors that detect different characteristics of targeting objects; performing, using a hardware processor, a plurality of manifold learning algorithms to process the joint manifold to obtain raw manifold learning results, wherein a dimension of the manifold learning results is less than a dimension of the joint manifold; processing the raw manifold learning results to obtain intrinsic parameters of the targeting objects; evaluating the multiple manifold learning algorithms based on the raw manifold learning results and the intrinsic parameters to determine one or more optimum manifold learning algorithms; and applying the one or more optimum manifold learning algorithms to fuse heterogeneous sensor data generated by the plurality sensors.

In some embodiments, the plurality sensors at least include a medium wavelength infrared camera and three radio frequency Doppler sensors.

In some embodiments, the dimension of the joint manifold is at least seven.

In some embodiments, the plurality of manifold learning algorithms at least include two of: maximally collapsing metric learning, neighborhood preserving embedding, Isomap, locally linear embedding, Hessian locally linear embedding, Laplacian Eigenmaps, diffusion maps, and local tangent space alignment.

In some embodiments, performing the plurality of manifold learning algorithms to process the joint manifold includes generating, for each of the plurality of manifold learning algorithms, a dimensionality reduction matrix to reduce the dimension of the joint manifold.

In some embodiments, evaluating the multiple manifold learning algorithms includes: selecting a subset of the multiple manifold learning algorithms as one or more candidate manifold learning algorithms by evaluating the raw manifold learning results; and selecting the one or more optimum manifold learning algorithms from the one or more candidate manifold learning algorithms by evaluating the intrinsic parameters.

In some embodiments, processing the raw manifold learning results includes performing a line regression to the raw manifold learning results for each of the plurality of manifold learning algorithms.

In some embodiments, performing the line regression includes generating, for each of the plurality of manifold learning algorithms, a rotating and zooming matrix, and a shifting matrix to lineally transform the raw manifold learning results to obtain the intrinsic parameters.

In some embodiments, the intrinsic parameters of the targeting objects at least include a position parameter and a velocity parameter of the targeting objects.

Another aspect of the present disclosure provides a system for joint manifold learning based heterogenous sensor data fusion, the system comprising: a hardware processor; and a memory storing instructions that, when executed by the hardware processor, cause the hardware processor to: obtain learning heterogeneous sensor data from a plurality sensors to form a joint manifold, wherein the plurality sensors include different types of sensors that detect different characteristics of targeting objects, perform a plurality of manifold learning algorithms to process the joint manifold to obtain raw manifold learning results, wherein a dimension of the manifold learning results is less than a dimension of the joint manifold, process the raw manifold learning results to obtain intrinsic parameters of the targeting objects, evaluate the multiple manifold learning algorithms based on the raw manifold learning results and the intrinsic parameters to determine one or more optimum manifold learning algorithms, and apply the one or more optimum manifold learning algorithms to fusing heterogeneous sensor data generated by the plurality sensors.

Another aspect of the present disclosure provides a non-transitory computer-readable medium containing computer-executable instructions that, when executed by a hardware processor, cause the hardware processor to perform a method for joint manifold learning based heterogenous sensor data fusion, the method comprising: obtaining learning heterogeneous sensor data from a plurality sensors to form a joint manifold, wherein the plurality sensors include different types of sensors that detect different characteristics of targeting objects; performing, using a hardware processor, a plurality of manifold learning algorithms to process the joint manifold to obtain raw manifold learning results, wherein a dimension of the manifold learning results is less than a dimension of the joint manifold; processing the raw manifold learning results to obtain intrinsic parameters of the targeting objects; evaluating the multiple manifold learning algorithms based on the raw manifold learning results and the intrinsic parameters to determine one or more optimum manifold learning algorithms; and applying the one or more optimum manifold learning algorithms to fuse heterogeneous sensor data generated by the plurality sensors.

Other aspects of the present disclosure can be understood by those skilled in the art in light of the description, the claims, and the drawings of the present disclosure.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the present disclosure, reference will now be made in detail to exemplary embodiments of the present disclosure, which are illustrated in the accompanying drawings. Wherever possible, the same reference numbers will be used throughout the drawings to refer to the same or like parts.

In accordance with various embodiments of the present disclosure, methods, systems and media for joint manifold learning based heterogenous sensor data fusion are provided.

In some embodiments, the disclosed method for joint manifold learning based heterogenous sensor data fusion can be used to fusing image data and radio frequency (RF) data. The method can include a training process and a testing process.

In the training phase, various manifold learning algorithms can be applied to extract the intrinsic information from raw sensor data via dimension reduction. The raw manifold learning results (i.e., the dimension reduction results) can be mapped to object trajectories of interest. The fusion results can be compared with ground truth data to evaluate the performance to select an optimal manifold learning algorithm. After the training process, the manifold learning matrices and linear regression matrices of the optimal manifold learning algorithm can be fixed.

In the testing process, the manifold learning matrices and linear regression matrices of the optimal manifold learning algorithm can be used for multiple sensor data applications. The testing process can follow a similar path from raw sensor data to joint manifolds, manifold learning algorithms, linear transformation, and to obtain object trajectories.

The method for joint manifold learning based heterogenous sensor data fusion can discover the embedded low intrinsic dimensionalities from the high dimensional sensor data. The disclosed method can provide fast and accurate heterogenous sensor data fusion.

Figure 1:
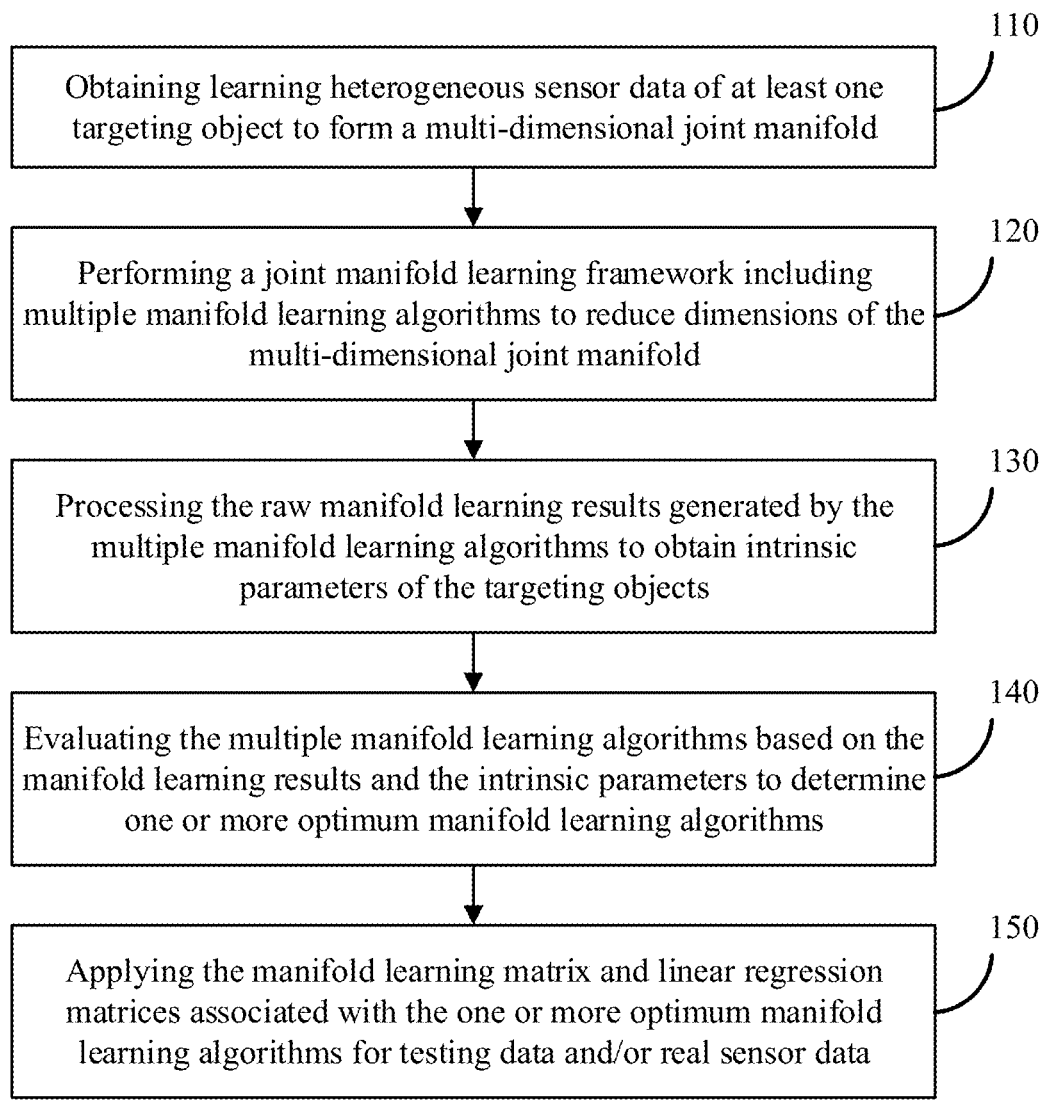
FIG. 1 illustrates a schematic flow diagram illustrating an exemplary process method for joint manifold learning based heterogenous sensor data fusion in accordance with some embodiments of the present disclosure.

Referring to FIG. 1, a schematic flow diagram illustrating an exemplary process method for joint manifold learning based heterogenous sensor data fusion is shown in accordance with some embodiments of the present disclosure.

At 110, learning heterogeneous sensor data of at least one targeting object can be obtained to form a multi-dimensional joint manifold. In some embodiments, the learning heterogeneous sensor data can include raw sensor data collected by various types of sensors.

In some embodiments, a scenario including multiple sensors that can detecting signals of at least one targeting object in the scenario can be first determined. For example, the scenario can be a traffic intersection, a highway toll station, a bridge, a tunnel entrance, a canal entrance, an airfield runway, etc., while the at least one targeting object in the scenarios can be pedestrians, vehicles, boats, airplanes, etc. The multiple sensors can include high definition cameras, infrared cameras, radio frequency Doppler sensors, laser radars, ultrasonic radars, acoustic sensors, temperature sensors, acceleration and vibration sensors, etc.

Figure 2:
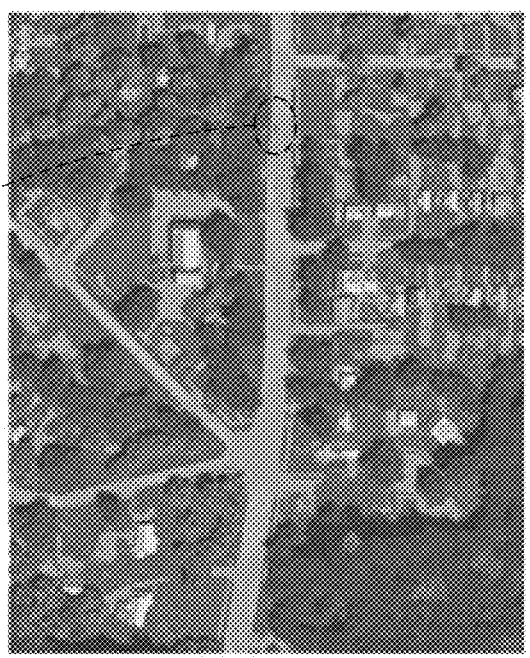
FIG. 2 illustrate a schematic diagram of an exemplary digital imaging and remote sensing image generation scene in accordance with some embodiments of the present disclosure.
Figure 2:
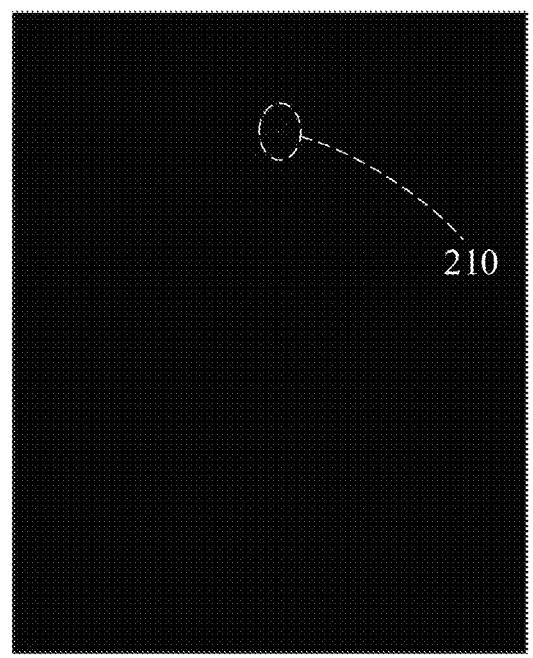

In the following, as shown in FIG. 2A, an exemplary digital imaging and remote sensing image generation (DIRSIG) scene 200 including one medium wavelength infrared (MWIR) camera and three radio frequency (RF) Doppler sensors are described as an exemplary scenario to demonstrate the disclosed method. It is noted that, the types and the numbers of the multiple sensors are not limited.

As shown in FIG. 2A, the digital imaging and remote sensing image generation (DIRSIG) scene 200 can include a view of interest, such as a traffic region. The targeting objects in the traffic region, such as vehicles with RF emitters (e.g., vehicle 210 shown in the dashed circle in FIG. 2A), can be observed by the MWIR camera and the three distributed RF Doppler sensors (not shown in FIG. 2A).

Figure 3A:
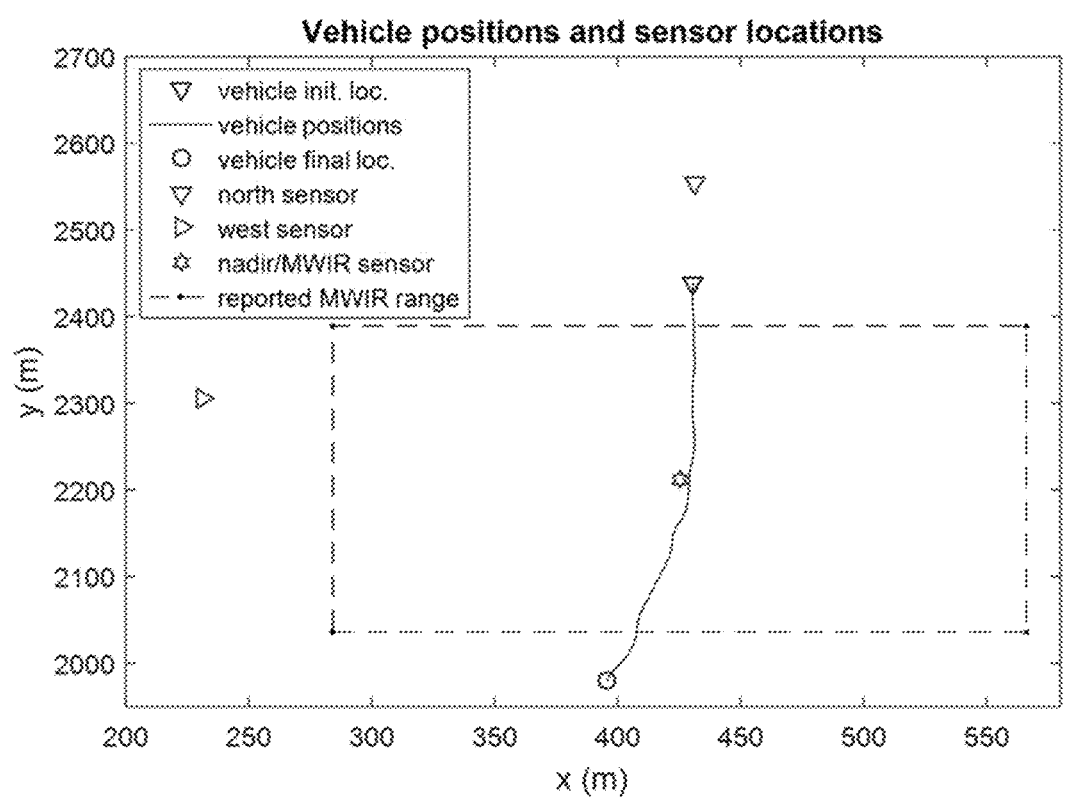
FIGS. 3A and 3B illustrate schematic diagrams of exemplary heterogeneous sensor data of a target object in accordance with some embodiments of the present disclosure.
Figure 3B:
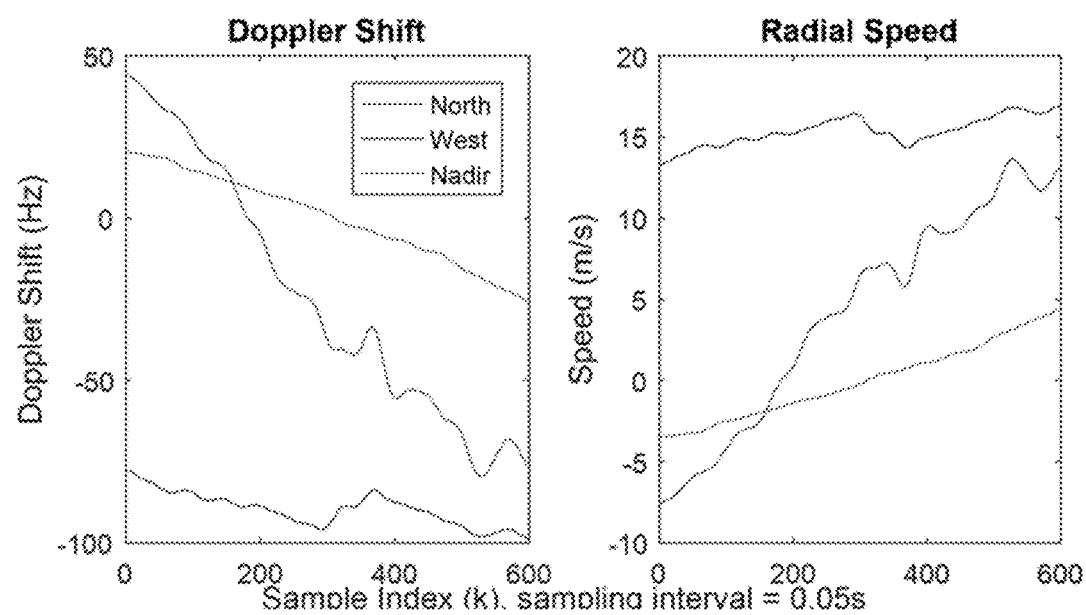

For the DIRSIG dataset, the heterogeneous sensor data of a reference vehicle traveling from north to south is selected as the learning heterogeneous sensor data for the leaning phase. The truth data of the reference vehicle is shown in FIGS. 3A and 3B. The targeting object, i.e., the reference vehicle, emits a single tone (a sinusoid signal) at the carrier frequency of 1.7478 GHz.

In some embodiments, the MWIR camera can be located in a center of the view of interest, and the three distributed RF Doppler sensors can be location at the center, the north, and the west of the view of interest, respectively. The three RF Doppler sensors are denoted by two triangle markers and a hexagonal marker as shown in FIG. 3A. One MWIR camera is collocated with a nadir RF Doppler sensor shown by the hexagonal marker in the center of the scenario.

The sensor modalities of images and Doppler effects can be analyzed in a way that joint manifolds can be formed by stacking up the MWIR data from the MWIR camera and the Doppler data from the three RF Doppler sensors. In some embodiments, the MWIR data can provide the positions and velocities of the targeting objects, while the Doppler data can represent the radial speeds of the targeting objects.

The MWIR camera can record the vehicle movements within field of view (FOV). For example, the MWIR camera can have a total of 599 frames or snapshots. One snapshot has a duration of 1/20 second. The image sequences or videos captured by the MWIR camera can be processed to a pixel location of each targeting object. Since the MWIR sensor is stationary, the background can be subtracted from each image to obtain the locations of the targeting object in the image. For example, as shown in FIG. 2B, the background including the buildings and roads are subtracted from the original image as shown in FIG. 2A, the location of vehicle 210 can be illustrated in the processed image in the dashed circle.

The three distributed RF Doppler sensors can receive signals from the RF emitters. The received RF signals can be sampled at any suitable rate, such as a rate of $1.575 \times 10^8$ samples per second, with $8.875 \times 10^6$ samples per snapshot.

The Doppler data from the three RF Doppler sensors can be processed to obtain Doppler shifts. The radial speed of a targeting object can be calculated based on the following Doppler shift equation:

$$\Delta f = f_c \sqrt{\frac{1-\frac{v}{c}}{1+\frac{v}{c}}} - f_c \approx -\frac{v}{c} f_c \text{ (given } v \ll c\text{)} \quad (1)$$

$$= -\frac{17.478 \times 10^8}{2.99792458 \times 10^8} v$$

$$= -5.83v.$$

In the above Doppler shift equation (1), $f_c$ is the transmitted frequency by a targeting object (e.g., 1.7478 GHz, etc.), c is the light speed, and v is the radial speed of object with respect to the RF Doppler sensor. It is noted that, v is considered negative when the source is approaching. The Doppler shifts and radial speeds of the reference vehicle are shown in FIG. 3B.

In some embodiments, each sensor modality (k) can form a manifold, which can be defined as:

$$\mathcal{M}_k = \{p_k = f_k(\theta): \theta \in \Theta\}, \quad (2)$$

where $\Theta$ is the parameter space. The parameter $\theta$ is the intrinsic variable or variable set in observed phenomena $f_k(\theta)$, which changes as a continuous function of the parameter $\theta$.

That is, for a number K of sensors, there are K manifolds. A product manifold can be defined as $$\mathcal{M} = \mathcal{M}_1 \times \mathcal{M}_2 \times \ldots \times \mathcal{M}_K. \quad (3)$$

A K-tuple point can be represented as $$p = p_1 \times p_2 \times \ldots \times p_K. \quad (4)$$

Accordingly, a joint manifold of a number K of sensor modalities can be defined as $$\mathcal{M}^* = \{p \in \mathcal{M} : p_j = \psi_j(p_1), j \in [2, 3, \ldots, K]\}. \quad (5)$$

It is noted that, the above definition of the joint manifold of multiple sensor modalities has a base manifold, to which all other manifolds can be constructed using the mapping $\psi_k$ respectively. The base manifold can be any manifold $\mathcal{M}_k$. Without loss of generality (WLOG), the first manifold can be set as the base manifold $\mathcal{M}_1$.

Still using the DIRSIG scene 200 described above as the example, for the learning heterogeneous sensor data, K=4, which includes one MWIR camera and three distributed RF Doppler sensors. The intrinsic parameters $\theta$ can be the targeting object's 3D location (x, y, z) and the velocities ($\dot{x}$, $\dot{y}$, $\dot{z}$). According to the definition of the joint manifold, the learning heterogeneous sensor data may not form a joint manifold because the z dimension cannot be observed by the MWIR camera, if the sensor data from the MWIR camera is used as the base manifold. However, a joint manifold can be formed if the intrinsic parameters are set to $\theta=(x, y, \dot{x}, \dot{y})$. This approximation is valid since the vehicles are moving on the ground and the heights, z, of vehicles are almost fixed. That is, the velocity of the vehicles in the vertical direction can be regarded as 0, $\dot{z}=0$.

Therefore, the learning heterogeneous sensor data in the DIRSIG scene 200 can be stacked to form a seven-dimensional (7D) joint manifold. That is, a 8D vector can be generated for each targeting object (e.g., vehicle), including one 4D MWIR data from the MWIR camera and one 1D Doppler sensor data from each of the three RF Doppler sensors.

It is noted that, the above 8D joint manifold is merely an example. As described above, the types and the numbers of the multiple sensors are not limited to form a multi-dimensional joint manifold. As such, the multi-dimensional joint manifold generated by stacking the learning heterogeneous sensor data can include any suitable number of dimensions.

Referring back to FIG. 1, at 120, a joint manifold learning framework (JMLF) including multiple manifold learning algorithms can be performed to reduce dimensions of the multi-dimensional joint manifold. For each manifold learning algorithm, a dimensionality reduction (DR) matrix can be obtained for reducing the multi-dimensional joint manifold to a raw manifold learning result having low dimensions.

It is noted that, manifold learning is an approach to non-linear dimensionality reduction. A joint manifold structure can lead to improved performance for dimensionality reduction and manifold learning. In other words, the joint manifold structure can facilitate finding the intrinsic variables from high dimensional data.

In some embodiments, the joint manifold learning framework (JMLF) can include multiple manifold learning algorithms. One or more of the multiple manifold learning algorithms can be employed on the multi-dimensional joint manifold obtained at 110 to reduce the high dimension sensor data to the low dimensional intrinsic parameters. That is, for the current scenario, each manifold learning algorithm can be associate with a dimensionality reduction (DR) matrix to reduce the multi-dimensional joint manifold to a raw manifold learning result having low dimensions. The low dimensional raw manifold learning result can be related to the intrinsic parameters of the detected objects in the view of interest.

In some embodiments, the joint manifold learning framework (JMLF) can include, but not limited to, maximally collapsing metric learning (MCML), neighborhood preserving embedding (NPE), Isomap, locally linear embedding (LLE), Hessian LLE, Laplacian Eigenmaps, diffusion maps, local tangent space alignment (LTSA), etc.

It is noted that, the maximally collapsing metric learning (MCML) can provide a method to learn low dimensional projections of the input data. The neighborhood preserving embedding (NPE) is a dimensionality reeducation algorithm with the focus on preserving the local manifold structure. Isomap is one of several widely used low-dimensional embedding methods, and can be used for computing a quasi-isometric, low-dimensional embedding of a set of high-dimensional data points. The locally linear embedding (LLE) can obtain a lower-dimensional projection of the data which preserves distances within local neighborhoods. The Hessian LLE is a method of solving the regularization problem of LLE, and can revolve around a hessian-based quadratic form at each neighborhood which is used to recover the locally linear structure. The Laplacian Eigenmaps can use spectral techniques to perform dimensionality reduction.

The diffusion maps can leverage the relationship between heat diffusion and a random walk to perform dimensionality reduction (DR) or feature extraction. The local tangent space alignment (LTSA) can characterize the local geometry at each neighborhood via its tangent space, and can perform a global optimization to align these local tangent spaces to learn the embedding.

Still using the DIRSIG scene 200 described above in connection with FIG. 2 as the example, the 8D joint manifold formed by stacking up one 4D MWIR data from the MWIR camera and one 1D Doppler sensor data from each of the three RF Doppler sensors can be processed by the multiple manifold learning algorithms desiccated above to obtain raw manifold learning results which have a lower dimensions. For example, the raw manifold learning results can be four dimensional data including intrinsic features related to the locations and velocities of the targeting object in the x-direction and the y-direction.

Figure 4:
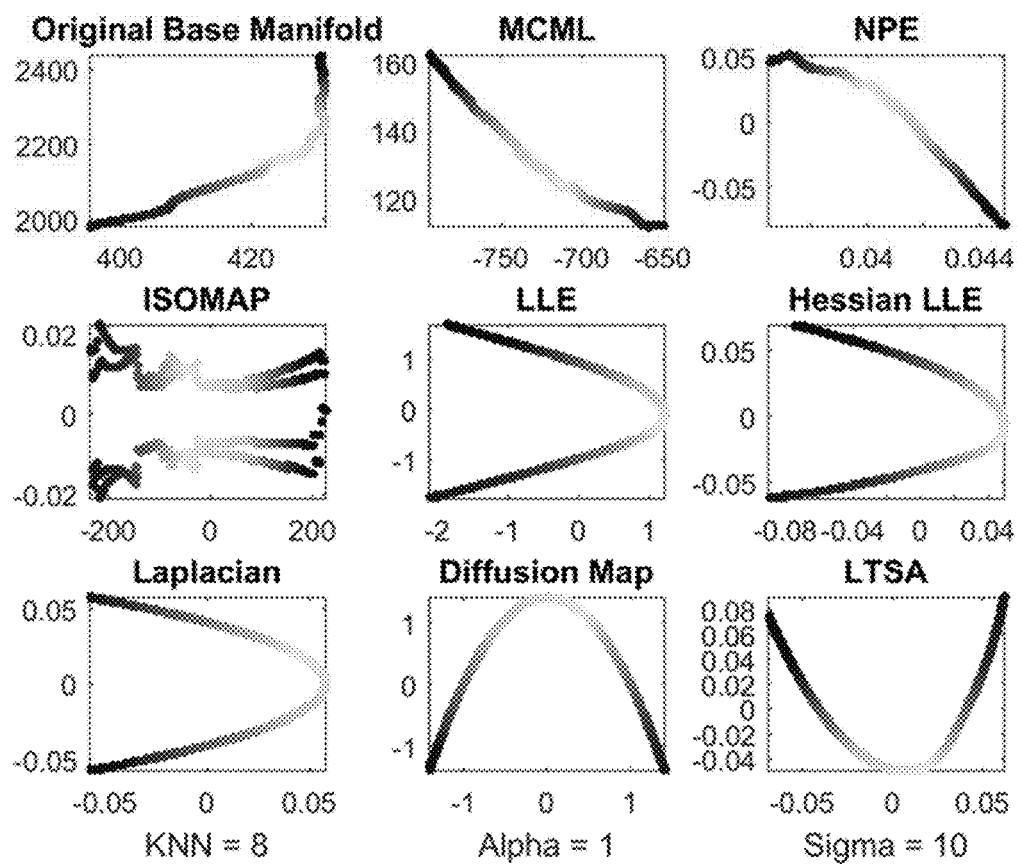
FIG. 4 illustrates schematic diagrams illustrating exemplary raw manifold learning results generated by eight different manifold learning algorithms in accordance with some embodiments of the present disclosure.

Referring to FIG. 4, schematic diagrams illustrating exemplary raw manifold learning results generated by eight different manifold learning algorithms are shown in accordance with some embodiments of the present disclosure. It is noted that the base manifold has four dimensions corresponding to the positions and velocities in x-direction and y-direction. For the illustration purpose, only two dimensional data of the raw manifold learning results relating to the position information of the reference target object is displayed in FIG. 4.

Referring back to FIG. 1, at 130, the raw manifold learning results generated by the multiple manifold learning algorithms in the JMLF framework can be processed to obtain intrinsic parameters of the targeting objects. In some embodiments, intrinsic parameters can include location parameters, speed parameters, acceleration parameters, temperature parameters, and/or any other suitable parameters that can indicate an intrinsic feature of the targeting objects.

Any suitable mapping method can be used to process the raw manifold learning results to obtain the intrinsic parameters of the targeting objects. Still using the DIRSIG scene 200 described above in connection with FIG. 2 as the example, since the goal is to determine the object tracks, the raw manifold learning results (i.e., the dimension reduction results) obtained at 120 can be mapped to object trajectories via line regression.

It is noted that, the raw manifold learning results extracted by manifold learning algorithms from the 8D joint manifold are four dimensional data for each target object (e.g., a vehicle). The four dimensional data can be represented by a linear transformation including a rotation, a shift, and/or a zoom of vehicle positions and velocities. The nonlinearities of the learning heterogeneous sensor data, such as the Doppler sensor data in DIRSIG datasets, can be handled by manifold learning algorithms at 120.

Therefore, a line regression process can be performed on the four dimensional raw manifold learning results to map the locations and velocities of the target objects in x-direction and y-direction. That is, line regression matrices, such as a rotating and zooming matrix, and a shifting matrix, can be determined to lineally transform the four dimensional raw manifold learning result obtained from each manifold learning algorithm to the locations and velocities of the target objects in x-direction and y-direction.

At 140, the multiple manifold learning algorithms in the JMLF framework can be evaluated based on the manifold learning results and the intrinsic parameters to determine one or more optimum manifold learning algorithms.

In some embodiments, in the learning or training phase, the multi-dimensional joint manifold of one or more reference target objects can be used to train the JMLF framework by evaluating and selecting manifold learning algorithms. Multiple manifold learning algorithms in the JMLF framework can be employed on the multi-dimensional joint manifold at 110 to reduce the high dimension sensor data to the low dimensional raw manifold learning results at 120. The raw manifold learning results (i.e., the dimension reduction results) generated at 120 can be processed to obtain intrinsic parameters of the one or more reference target objects at 130. The raw manifold learning results and the intrinsic parameters of the one or more reference target objects corresponding to each of the multiple manifold learning algorithms can be used to evaluate each of the multiple manifold learning algorithms. Based on the evaluation results, one or more manifold learning algorithms can be selected as the optimum manifold learning algorithms for the current scenario.

In some embodiments, the learning performance can be first evaluated by the similarity between the raw manifold learning results and the truth data of the one or more reference target objects. As such, one or more winners of the multiple manifold learning algorithms in the JMLF framework can be selected in the first round. Then, errors between the intrinsic parameters and training data can be exploited to further distinguish the optimum manifold learning algorithms from the winners of the first round for the current scenario.

Still using the DIRSIG scene 200 described above in connection with FIG. 2 as the example, based on the raw manifold learning results of eight manifold learning algorithms as shown in FIG. 4, MCML and NPE can be selected in the first round, because their raw results match the original base manifold. It is noted that the base manifold has four dimensions corresponding to the positions and velocities in x-direction and y-direction. For the illustration purpose, only two dimensional data of the raw manifold learning results relating to the position information of the reference target object is displayed in FIG. 4.

Next, the intrinsic parameters, i.e., the locations and velocities of the reference target object in x-direction and y-direction can be compared to the truth data including the locations and velocities of the one or more reference target objects. And the position errors and velocity errors between the linear regress and training data can be further analyzed. Accordingly, one or more optimum manifold learning algorithms can be determined for the DIRSIG scene 200.

Figure 5A:
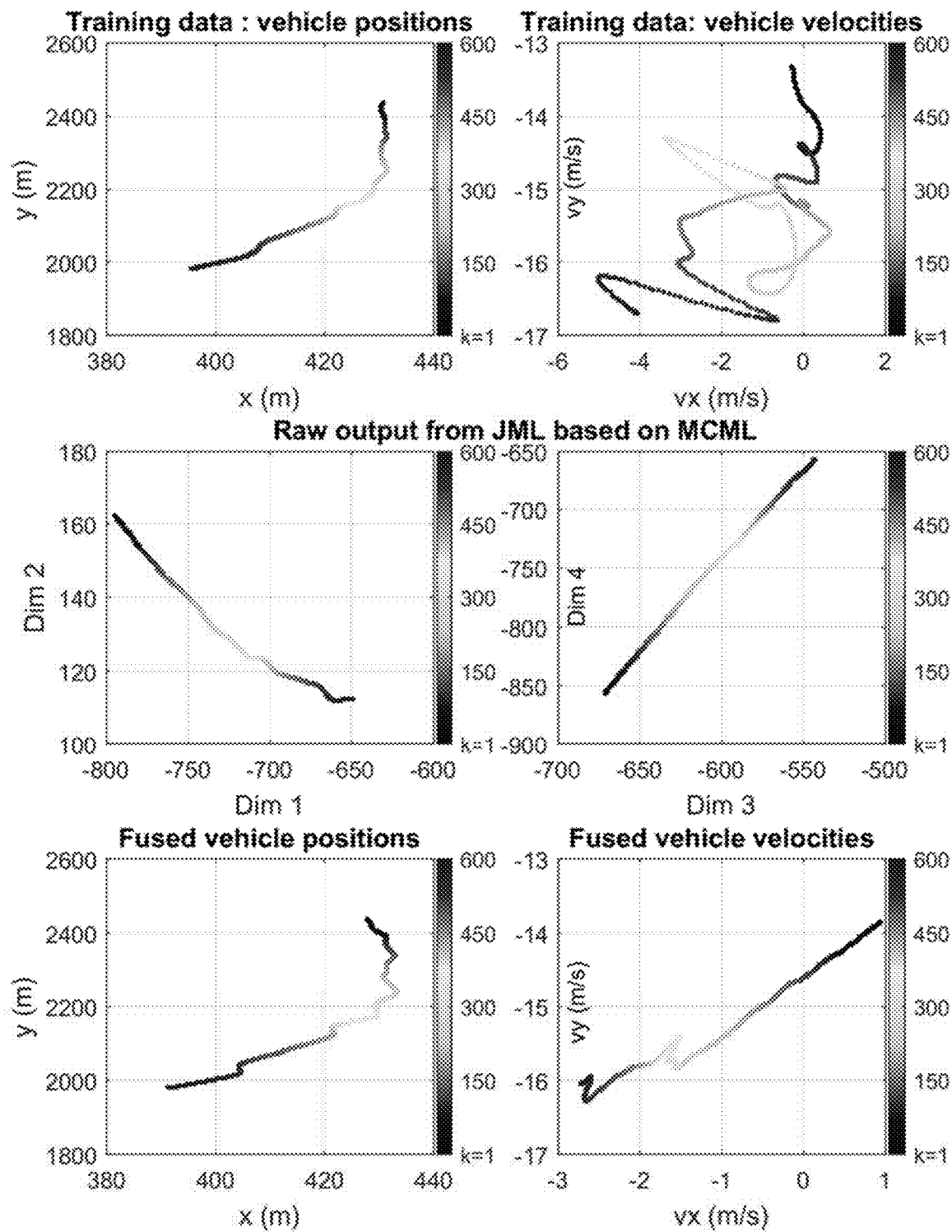
FIGS. 5A and 5B illustrate schematic block diagrams of exemplary training results and performance obtained from maximally collapsing metric learning algorithm in accordance with some embodiments of the present disclosure.
Figure 5B:
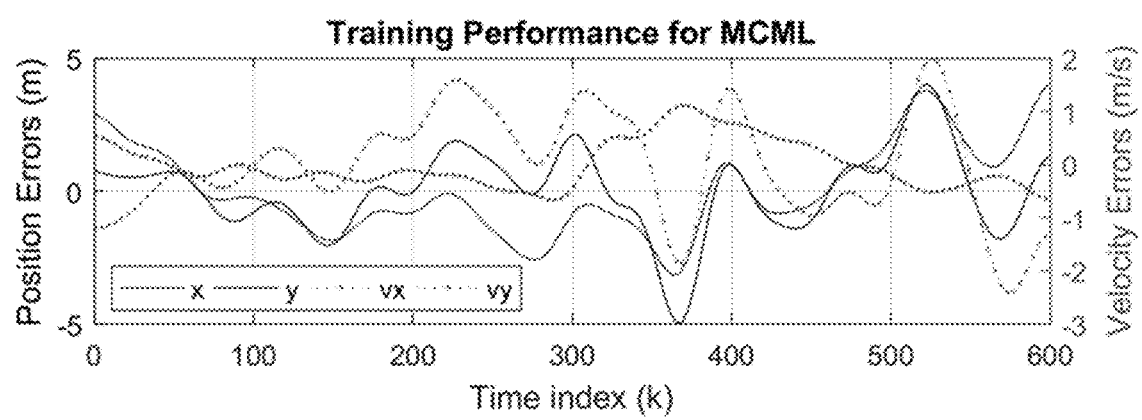
Figure 6A:
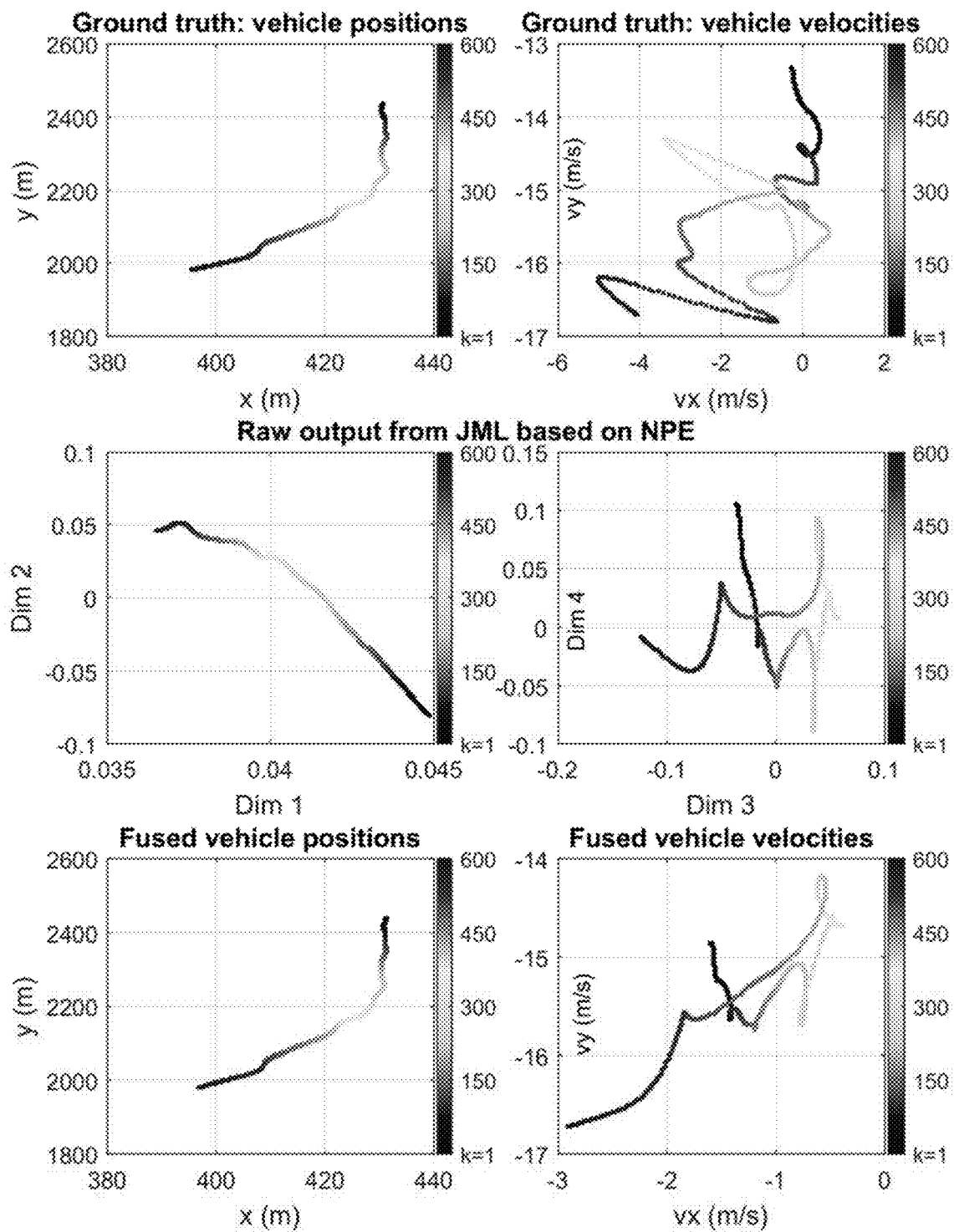
FIGS. 6A and 6B illustrate schematic block diagrams of exemplary training results and performance obtained from neighborhood preserving embedding algorithm in accordance with some embodiments of the present disclosure.
Figure 6B:
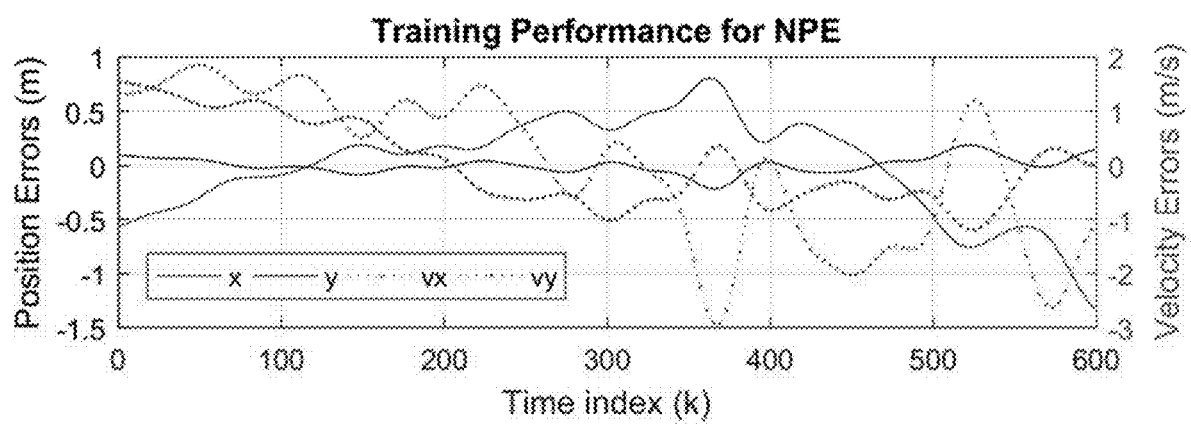

For example, based on the selection result of the first round, MCML and NPE can be compared in the second round. The position training results and performance obtained from MCML are shown in FIGS. 5A and 5B, while the position training results and performance obtained from NPE are shown in FIGS. 6A and 6B. It can be determined that NPE is better than MCML for DIRSIG scene 200 because it has smaller position errors and similar velocity mismatches.

Referring back to FIG. 1, at 150, the manifold learning matrix and linear regression matrices associated with the one or more optimum manifold learning algorithms can be used for testing data and/or real sensor data.

After the learning phase, one or more optimum manifold learning algorithms can be selected. Each selected optimum manifold learning algorithm can be associated with at least one manifold learning matrix and at least two linear regression matrices. The at least one manifold learning matrix can be the dimensionality reduction (DR) matrix determined at 120. The at least two linear regression matrices can include the rotating and zooming matrix and the shifting matrix determined at 130.

The at least one manifold learning matrix and at least two linear regression matrices can be used in the testing phase for testing heterogeneous sensor data and/or real heterogeneous sensor data. The testing phase may follow a similar path of the learning phase described above.

The testing heterogeneous sensor data and/or real heterogeneous sensor data can be collected from the multiple sensors for detecting signals of at least one targeting object in the scenario. That is, the testing heterogeneous sensor data and/or real heterogeneous sensor data can have same data structure compared with the learning heterogeneous sensor data described above. Thus, the testing heterogeneous sensor data and/or real heterogeneous sensor data can form multi-dimensional joint manifolds having a same dimension as the multi-dimensional joint manifold of the learning heterogeneous sensor data described above at 110.

The one or more optimum manifold learning algorithms can be used to respectively reduce the dimension of the multi-dimensional joint manifolds of the testing heterogeneous sensor data and/or real heterogeneous sensor data. That is, the manifold learning matrix, i.e., the dimensionality reduction (DR) matrix, of each optimum manifold learning algorithm can be applied to the multi-dimensional joint manifolds of the testing heterogeneous sensor data and/or real heterogeneous sensor data to obtain raw low-dimensional data.

The raw low-dimensional data can be processed to obtain intrinsic parameters of the targeting objects corresponding to the testing heterogeneous sensor data and/or real heterogeneous sensor data. For example, for each of the one or more optimum manifold learning algorithms, the corresponding linear regression matrices including the rotating and zooming matrix and the shifting matrix can be applied to linearly transform the corresponding raw low-dimensional data to obtain the intricacy parameters of the targeting objects corresponding to the testing heterogeneous sensor data and/or real heterogeneous sensor data.

It should be noted that the above steps of the flow diagram of FIG. 1 can be executed or performed in any order or sequence not limited to the order and sequence shown and described in the figure. Also, some of the above steps of the flow diagram of FIG. 1 can be executed or performed substantially simultaneously where appropriate or in parallel to reduce latency and processing times. Furthermore, it should be noted that FIG. 1 is provided as an example only. At least some of the steps shown in the figure may be performed in a different order than represented, performed concurrently, or altogether omitted.

Figure 7:
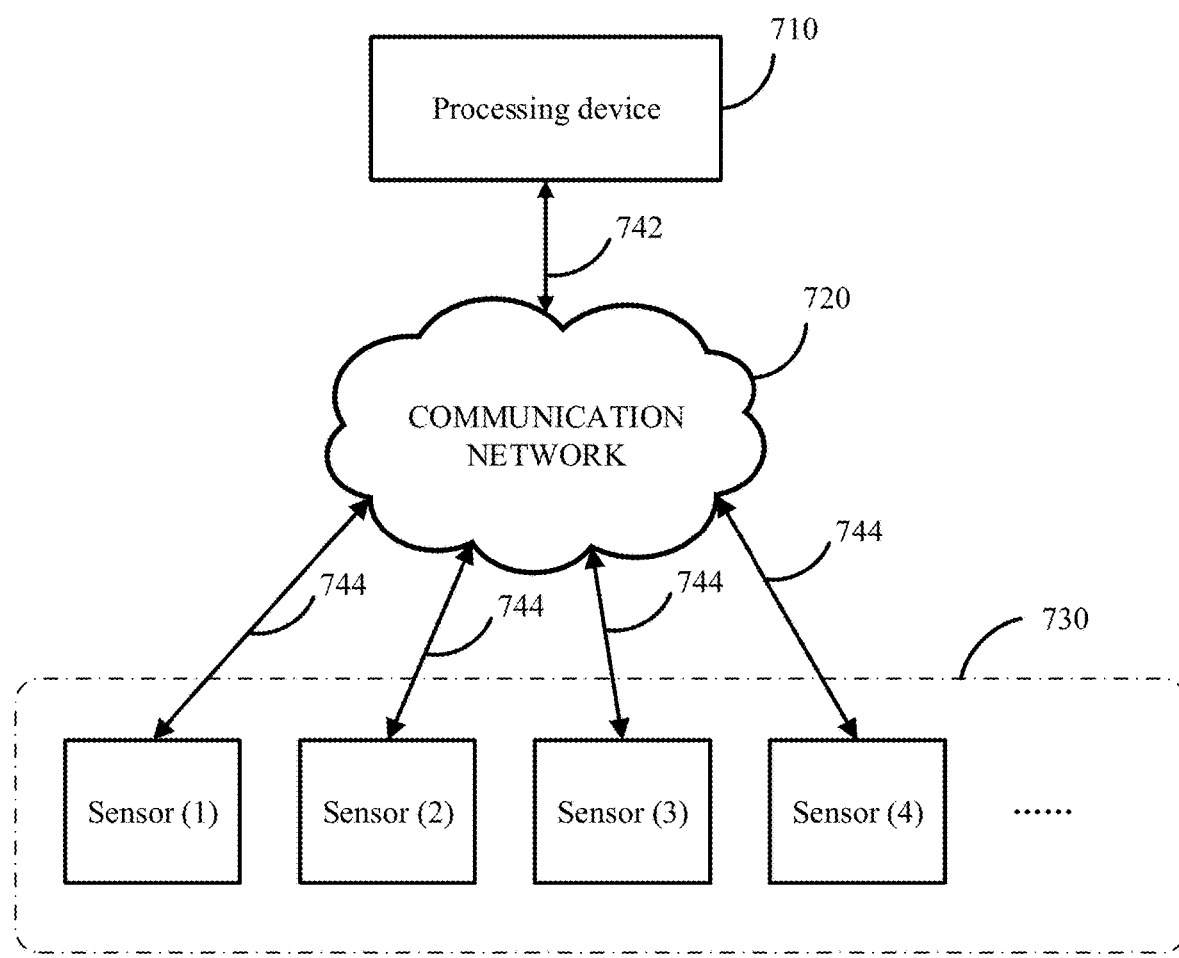
FIG. 7 illustrates an schematic block diagram of an exemplary system for joint manifold learning based heterogenous sensor data fusion in accordance with some embodiments of the present disclosure.

FIG. 7 illustrates a schematic block diagram of an exemplary system for joint manifold learning based heterogenous sensor data fusion in accordance with some embodiments of the present disclosure. As illustrated, the system can include one or more processing devices 710, a communication network 720, multiple sensors 730, and/or any other suitable component. The multiple sensors 730 can be connected by one or more communication links 744 to the communications network 720 that can be linked via a communication link 742 to the one or more processing devices 710.

In some embodiments, one or more steps of, or all of, the method for joint manifold learning based heterogenous sensor data fusion described above in connection with FIG. 1, can be implemented by one or more suitable hardware processors of the one or more processing devices 710, and/or other suitable component of the system. The one or more processing devices 710 can include any suitable devices that can communicate with one or more severs though communication network 720, receive user query, process and transmit data, and/or processing heterogenous sensor data transmitted from the multiple sensors 730, and/or perform any other suitable function. For example, the one or more processing devices 710 can include a mobile phone, a tablet computer, a laptop computer, a desktop computer, a server, and/or any other suitable device.

In some embodiments, communication network 720 can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

The multiple sensors 730 can at least include two or more types of high definition cameras, infrared cameras, radio frequency Doppler sensors, laser radars, ultrasonic radars, acoustic sensors, temperature sensors, acceleration and vibration sensors, and any other suitable sensors that can detect a characteristic of a targeting object. Although four sensors are shown in FIG. 7 to avoid over-complicating the drawing, any suitable number of sensors, and any suitable types of sensors, can be used in some embodiments.

Figure 8:
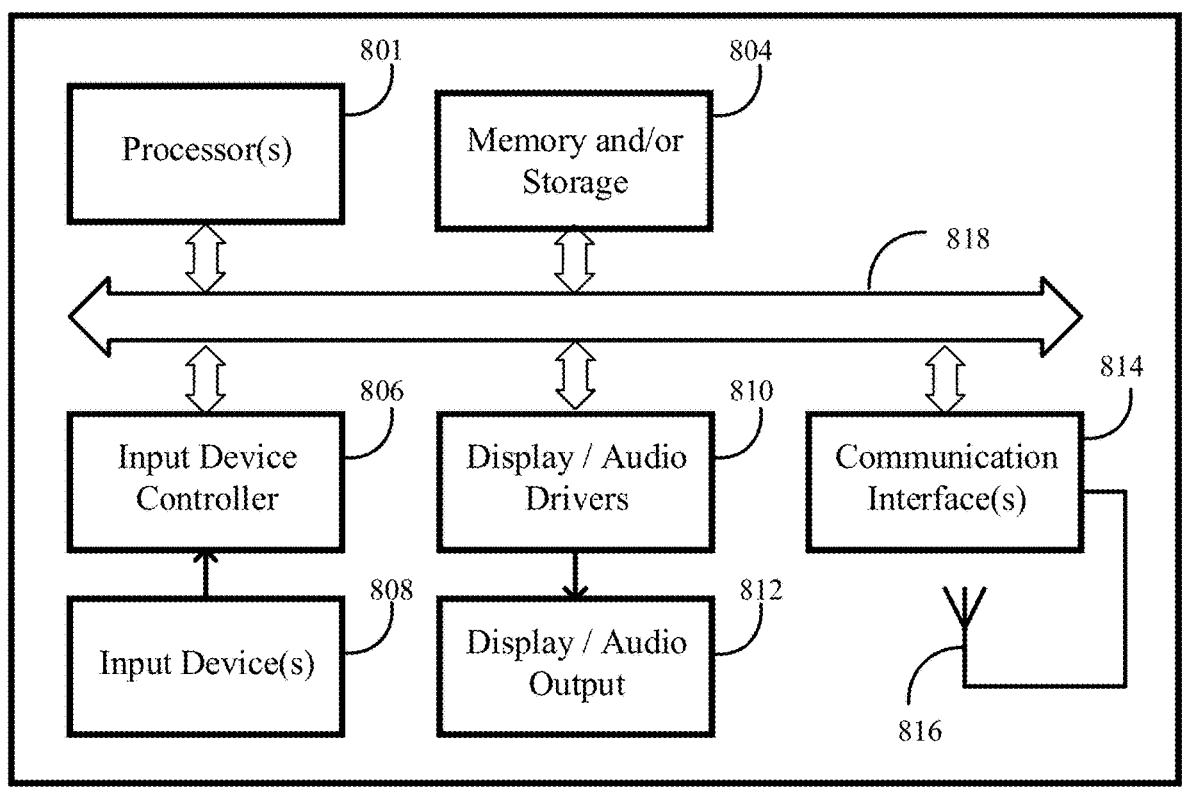
FIG. 8 illustrates a schematic block diagram of exemplary hardware of a processing device for joint manifold learning based heterogenous sensor data fusion in accordance with some embodiments of the present disclosure.

Referring to FIG. 8, a schematic block diagram of exemplary hardware of a processing device for joint manifold learning based heterogenous sensor data fusion is shown in accordance with some embodiments of the present disclosure.

As illustrated, the hardware of the processing device 800 for joint manifold learning based heterogenous sensor data fusion can include at least one hardware processor 801, at least one memory and/or storage 804, at least one input device controller 806, multiple input devices 808, display/audio drivers 810, display and audio output circuitry 812, communication interface(s) 814, one or more antennas 816, a bus 818, and any other suitable components.

The at least one hardware processor 801 can include any suitable hardware processor(s), such as microprocessor, micro-controller, a central process unit, graphics processing unit, digital signal processor, array processor, vector processor, dedicated logic, and/or any other suitable circuitry for controlling the functioning of a general purpose computer or special purpose computer in some embodiments.

In some embodiments, the at least one hardware processor 801 can implement or execute various embodiments of the present disclosure including one or more method, operations and block/logic diagrams. For example, the at least one hardware processor 801 can perform at least some of the processes/operations as described above in connection with FIG. 1.

The processes/operations of the disclosed method in various embodiments can be directly executed by a combination of the at least one hardware processor 801 and one or more software modules. The one or more software modules may reside in any suitable storage/memory medium, such as a random access memory, a flash memory, a read-only memory, a programmable read-only memory, an electrically erasable programmable memory, a register, etc. The storage medium can be located in the at least one memory and/or storage 804. The at least one hardware processor 801 can implement the processes/operations of the disclosed method by combining the hardware and the information read from the at least one memory and/or storage 804.

The at least one memory and/or storage 804 can be any suitable memory and/or storage for storing programs, data, media content, comments, information of users and/or any other suitable content in some embodiments. For example, the at least one memory and/or storage 804 can include random access memory, read only memory, flash memory, hard disk storage, optical media, and/or any other suitable storage device.

The at least one input device controller 806 can be any suitable circuitry for controlling and receiving input from the multiple input devices 808 in some embodiments. For example, input device controller 806 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving data input and/or signal input.

The display/audio drivers 810 can be any suitable circuitry for controlling and driving output to one or more display and audio output circuitries 812 in some embodiments. For example, display/audio drivers 810 can be circuitry for driving an LCD display, a speaker, an LED, and/or any other display/audio device.

The communication interface(s) 814 can be any suitable circuitry for interfacing with one or more communication networks. For example, interface(s) 814 can include network interface card circuitry, wireless communication circuitry, and/or any other suitable circuitry for interfacing with one or more communication networks. In some embodiments, communication network can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

The one or more antennas 816 can be any suitable one or more antennas for wirelessly communicating with a communication network in some embodiments.

The bus 818 can be any suitable mechanism for communicating between two or more of components 801, 804, 806, 810, and 814 in some embodiments. The bus 818 may be an Industry Standard Architecture (ISA) bus, a Peripheral Component Interconnect (PCI) bus, an Expended-ISA (EISA) bus, or any other suitable bus. The bus 818 can be divided into an address bus, a data bus, a control bus, etc. The bus 818 is represented as a two-way arrow in FIG. 8, but it does not mean that it is only one type bus or only one bus.

Any other suitable components not shown in FIG. 8 can be included in the hardware in accordance with some embodiments. Any unnecessary components shown in FIG. 8 may also be omitted in the hardware in accordance with some other embodiments.

In some embodiments, some portions of the various embodiments of the disclosed method and system, as well as some portions of architectures, functions and operations that can be implemented by computer program products. In this case, some blocks of the flow diagram or the block diagram may represent a module, a code segment, a portion of program code. Each module, each code segment, and each portion of program code can include one or more executable instructions for implementing predetermined logical functions.

It should also be noted that, each block in the block diagram and/or flow diagram, as well as the combinations of the blocks in the block diagrams and/or flow diagram, can be realized by a dedicated hardware-based system for executing specific functions, or can be realized by a dedicated system combined by hardware and computer instructions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed present disclosure to the specific examples; rather, the examples are intended to illustrate only some of many possible aspects.

Accordingly, methods, systems and media for joint manifold learning based heterogenous sensor data fusion are provided. The heterogeneous sensor data can be stacked-up as the inputs to the JMLF to form a joint sensor-data manifold. Multiple manifold learning algorithms can be applied to discover the embedded low intrinsic dimensionalities from the high dimensional sensor data. Training data can be used to tune the JMLF mapping from the intrinsic dimensionalities to the multi-modality object tracking results.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A method for joint manifold learning based heterogenous sensor data fusion, comprising:
   obtaining learning heterogeneous sensor data from a plurality sensors to form a joint manifold, wherein the plurality sensors include different types of sensors that detect different characteristics of targeting objects;
   performing, using a hardware processor, a plurality of manifold learning algorithms to process the joint manifold to obtain raw manifold learning results, wherein a dimension of the manifold learning results is less than a dimension of the joint manifold;
   processing the raw manifold learning results to obtain intrinsic parameters of the targeting objects;
   evaluating the multiple manifold learning algorithms based on the raw manifold learning results and the intrinsic parameters to determine one or more optimum manifold learning algorithms, wherein evaluating the multiple manifold learning algorithms includes:
      selecting a subset of the multiple manifold learning algorithms as one or more candidate manifold learning algorithms by evaluating the raw manifold learning results; and
      selecting the one or more optimum manifold learning algorithms from the one or more candidate manifold learning algorithms by evaluating the intrinsic parameters; and
   applying the one or more optimum manifold learning algorithms to fuse heterogeneous sensor data generated by the plurality sensors.

2. The method of claim 1, wherein the plurality sensors at least include a medium wavelength infrared camera and three radio frequency Doppler sensors.

3. The method of claim 1, wherein the dimension of the joint manifold is at least seven.

4. The method of claim 1, wherein the plurality of manifold learning algorithms at least include two of:
   maximally collapsing metric learning, neighborhood preserving embedding, Isomap, locally linear embedding, Hessian locally linear embedding, Laplacian Eigenmaps, diffusion maps, and local tangent space alignment.

5. The method of claim 1, wherein performing the plurality of manifold learning algorithms to process the joint manifold includes:
   generating, for each of the plurality of manifold learning algorithms, a dimensionality reduction matrix to reduce the dimension of the joint manifold.

6. The method of claim 1, wherein processing the raw manifold learning results includes:
   performing a line regression to the raw manifold learning results for each of the plurality of manifold learning algorithms.

7. The method of claim 6, wherein performing the line regression includes: generating, for each of the plurality of manifold learning algorithms, a rotating and zooming matrix, and a shifting matrix to lineally transform the raw manifold learning results to obtain the intrinsic parameters.

8. The method of claim 1, wherein the intrinsic parameters of the targeting objects at least include a position parameter and a velocity parameter of the targeting objects.

9. A system for joint manifold learning based heterogenous sensor data fusion, the system comprising:
   a hardware processor; and
   a memory storing instructions that, when executed by the hardware processor, cause the hardware processor to:
      obtain learning heterogeneous sensor data from a plurality sensors to form a joint manifold, wherein the plurality sensors include different types of sensors that detect different characteristics of targeting objects,
      perform a plurality of manifold learning algorithms to process the joint manifold to obtain raw manifold learning results, wherein a dimension of the manifold learning results is less than a dimension of the joint manifold,
      process the raw manifold learning results to obtain intrinsic parameters of the targeting objects,
      evaluate the multiple manifold learning algorithms based on the raw manifold learning results and the intrinsic parameters to determine one or more optimum manifold learning algorithms, wherein the instructions further cause the hardware processor to:
         select a subset of the multiple manifold learning algorithms as one or more candidate manifold learning algorithms by evaluating the raw manifold learning results; and select the one or more optimum manifold learning algorithms from the one or more candidate manifold learning algorithms by evaluating the intrinsic parameters; and apply the one or more optimum manifold learning algorithms to fusing heterogeneous sensor data generated by the plurality sensors.

10. The system of claim 9, wherein the plurality sensors at least include a medium wavelength infrared camera and three radio frequency Doppler sensors.

11. The system of claim 9, wherein the dimension of the joint manifold is at least seven.

12. The system of claim 9, wherein the plurality of manifold learning algorithms at least include two of:

maximally collapsing metric learning, neighborhood preserving embedding, Isomap, locally linear embedding, Hessian locally linear embedding, Laplacian Eigenmaps, diffusion maps, and local tangent space alignment.

13. The system of claim 9, wherein the instructions further cause the hardware processor to:

generate, for each of the plurality of manifold learning algorithms, a dimensionality reduction matrix to reduce the dimension of the joint manifold.

14. The system of claim 9, wherein the instructions further cause the hardware processor to:

perform a line regression to the raw manifold learning results for each of the plurality of manifold learning algorithms.

15. The system of claim 14, wherein the instructions further cause the hardware processor to:

generate, for each of the plurality of manifold learning algorithms, a rotating and zooming matrix, and a shifting matrix to lineally transform the raw manifold learning results to obtain the intrinsic parameters.

16. The system of claim 9, wherein the intrinsic parameters of the targeting objects at least include a position parameter and a velocity parameter of the targeting objects.

17. A non-transitory computer-readable medium containing computer-executable instructions that, when executed by a hardware processor, cause the hardware processor to perform a method for joint manifold learning based heterogenous sensor data fusion, the method comprising:

obtaining learning heterogeneous sensor data from a plurality sensors to form a joint manifold, wherein the plurality sensors include different types of sensors that detect different characteristics of targeting objects;

performing, using a hardware processor, a plurality of manifold learning algorithms to process the joint manifold to obtain raw manifold learning results, wherein a dimension of the manifold learning results is less than a dimension of the joint manifold;

processing the raw manifold learning results to obtain intrinsic parameters of the targeting objects;

evaluating the multiple manifold learning algorithms based on the raw manifold learning results and the intrinsic parameters to determine one or more optimum manifold learning algorithms, wherein evaluating the multiple manifold learning algorithms includes:

selecting a subset of the multiple manifold learning algorithms as one or more candidate manifold learning algorithms by evaluating the raw manifold learning results; and selecting the one or more optimum manifold learning algorithms from the one or more candidate manifold learning algorithms by evaluating the intrinsic parameters; and applying the one or more optimum manifold learning algorithms to fuse heterogeneous sensor data generated by the plurality sensors.

* * * * *